(12) United States Patent
Hunt et al.

(10) Patent No.: US 9,602,520 B2
(45) Date of Patent: Mar. 21, 2017

(54) PREVENTING URL CONFUSION ATTACKS

(71) Applicant: Apple Inc., Cupertino, CA (US)

(72) Inventors: Oliver J. Hunt, Oakland, CA (US); Ivan Krstic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/932,877

(22) Filed: Nov. 4, 2015

(65) Prior Publication Data

US 2016/0127389 A1    May 5, 2016

Related U.S. Application Data

(63) Continuation of application No. 14/097,140, filed on Dec. 4, 2013, now Pat. No. 9,203,849.

(51) Int. Cl.
*H04L 29/06* (2006.01)
*H04L 29/08* (2006.01)

(52) U.S. Cl.
CPC ...... *H04L 63/1408* (2013.01); *H04L 63/1466* (2013.01); *H04L 67/02* (2013.01)

(58) Field of Classification Search
None
See application file for complete search history.

(56) References Cited

U.S. PATENT DOCUMENTS

| | | |
|---|---|---|
| 7,668,921 B2 | 2/2010 | Proux et al. |
| 8,201,259 B2 | 6/2012 | Pietraszek et al. |
| 8,224,994 B1 | 7/2012 | Schneider |
| 8,291,065 B2 | 10/2012 | Goodman et al. |
| 8,438,642 B2 | 5/2013 | Feng et al. |
| 2006/0080735 A1 | 4/2006 | Brinson et al. |
| 2006/0101514 A1 | 5/2006 | Milener et al. |
| 2007/0283000 A1 | 12/2007 | Proux et al. |
| 2012/0011588 A1 | 1/2012 | Milener et al. |
| 2014/0013426 A1 | 1/2014 | Douceur et al. |

OTHER PUBLICATIONS

Wikipedia. "IDN homograph attack." http://en.wikipedia.org/wiki/DN-homograph-attack. (Aug. 14, 2013).

*Primary Examiner* — Amir Mehrmanesh
(74) *Attorney, Agent, or Firm* — Downey Brand LLP

(57) ABSTRACT

Methods and apparatus are disclosed for detecting illegitimate or spoofed links on a web page. Illegitimate links can be detected by receiving a web link that includes link text and a link address, generating normalized link text based upon the link text, wherein characters in the link text that are visually similar are represented by a single normalized character identifier in the normalized text, determining whether the normalized link text is in the format of a link address, and determining that the text is safe when the normalized link text is not in the format of a link address. The techniques disclosed herein further involve determining whether the normalized link text matches the link address, determining that the text is safe when the normalized link text matches the link address, and determining that the text is unsafe when the normalized link text does not match the link address.

15 Claims, 8 Drawing Sheets

PREVENTING URL CONFUSION ATTACKS

CROSS-REFERENCE TO RELATED APPLICATIONS

This application is a continuation of U.S. application Ser. No. 14/097,140, filed Dec. 4, 2013, now issued U.S. Pat. No. 9,203,849, the contents of which are incorporated herein by reference in their entirety for all purposes.

FIELD

The present invention relates generally to detection of spoofing attacks that involve illegitimate text that is visually similar to legitimate text. More particularly, the present embodiments relate to detection of illegitimate web links via fuzzy matching techniques.

BACKGROUND

Electronic content, such as web pages, search results, and other types of documents, often includes links to other documents, web pages, and the like. A link is a connection from one page to another that can be selected from a first page to cause the other page to appear in a web browser application or the like. The links on a page can be defined by the author of the page, or can be added to the page automatically, e.g., by an advertising system that adds advertisements to the page. Pages can be generated by an automated system such as a search engine, which identifies web pages that are available via a network such as the Internet, and adds links to those pages based upon the addresses that are found by the search engine. Attracting users to a web site can be desirable for a number of reasons. Illegitimate or malicious web sites can to attempt to gather private information such as email addresses and passwords from users, e.g., through phishing attacks. There are also more benign reasons to attract users to a web site, such as to increase the site's traffic, the number of times advertisements have been viewed on the site, and so on.

Web link spoofing attacks have been developed to attract users to web sites that the users do not intend to visit. These spoofing attacks deceptively present an illegitimate web link that appears legitimate. For example, suppose that a web site named Good Web Site has a legitimate web link good.com. The link good.com looks similar to the link g00d.com, in which each letter o is replaced by the number 0. The two links look particularly similar if they are displayed in uppercase, i.e., G00D.COM and GOOD.COM. As another example, the letter l in a legitimate link can be changed to a number 1 to create an illegitimate link that is visually similar to the legitimate link.

URL's can contain characters from numerous international languages. There are a number of characters in different languages that look alike. Characters that look alike are referred to as homographs. URL spoofing attacks that take advantage of the visual similarities between different characters that can be from different languages are thus referred to as Internationalized Domain Name (IDN) homograph attacks. For example, the English letter c (pronounced cee) looks similar to the Russian letter c (pronounced ess). A URL that includes an English c, such as chase.com, can be spoofed by a URL that uses a Russian c in place of the English c, and looks very similar, such as chase.com. A user can be lured to an illegitimate version of the chase.com web site that is registered to the spoofed chase.com domain name by presenting a hyperlink having a URL that refers to the spoofed chase.com. Users are unlikely to see the difference between the legitimate and spoofed domain names, and thus unlikely to be aware that they are accessing an illegitimate web site, particularly if the illegitimate web site's appearance is similar to that of the legitimate chase.com site.

Because of such visual similarity between different characters, users can be lured into clicking on or selecting the illegitimate link when they intend to access the legitimate web site. When the user follows the web link to the illegitimate g00d.com web site, the illegitimate web site is loaded and displayed, and the spoofing attack has succeeded. The illegitimate site can, for example, display information or advertisements, attempt to convince the user to perform a transaction, request information from the user, attempt to install malware or spyware on the user's computer, and perform other malicious or potentially damaging operations. Spoofed web links can lead users to phishing attacks, in which an illegitimate site is designed to mimic sites that contain important user information and convince the user to login, thereby providing an attacker with their user name and password.

A web link ordinarily has two parts: link text and a reference to a target web page, such as a Uniform Resource Locator (URL) that identifies the target web page. The link text is displayed on a web page to visually represent the link. The link text can be clicked on or selected to cause a web browser to load the target web page referred to by the URL. The link text can also be referred to as anchor text, a link label, or a link title.

For example, in the Good Web Site example, a link to the site can have link text such as "Good Web Site" or "www-.good.com", and a link URL such as www.good.com. In one aspect, a legitimate link URL correctly references the web site described or implied by the link's link text, such as www.good.com. An illegitimate link has a URL, such as g00d.com, that references a web site different from that described or implied by the link text. The link text is not necessarily the same as the link URL, and can be a description or name of the web page referred to by the link instead of a textual copy of the link URL. However, illegitimate links often set the link text to a URL, at least in part because users are more likely to trust and follow a link that is displayed as a legitimate-looking URL, as opposed to a link displayed as a word or phrase. Therefore, illegitimate links can set the link text to a legitimate URL and set the URL to an illegitimate link in an attempt to lure users into following the legitimate URL. Alternatively, illegitimate links can set the link text to an illegitimate URL, e.g., g00d.com, that looks similar to the legitimate URL, such as good.com, and again set the link URL to the illegitimate URL, g00d.com, so that a comparison of the characters that represent the link text to the characters that represent the link URL will indicate that both are the same, and such a comparison will not identify the link as illegitimate.

Although the link text is ordinarily displayed on web pages to represent the link, the user is able to view the link URL itself, e.g., by placing a cursor or mouse pointer over the link text, and when a user actually opens the illegitimate page. Thus, the user can then attempt to visually verify that the URL is legitimate by placing the mouse pointer over the link text prior to clicking on the link, and checking the URL that is displayed. The user can also attempt to visually verify the URL by clicking on the link, allowing the target page to begin loading, and visually verify the URL that is displayed in the browser's address bar. In either situation, if the URL appears to be illegitimate, e.g., because it references a web site or contains text that does not appear to be related to the link text, then the user can decide to ignore the link or the loaded target page. However, if the URL appears to be legitimate, then the user is likely to follow the illegitimate link or read the illegitimate loaded target page. It would be desirable, therefore, to protect users against web link spoofing, so that users do not unintentionally access illegitimate web pages.

Existing techniques for blocking web link spoofing attacks include filtering based on heuristics, and blocking sites that appear on lists of known unsafe pages. The heuristics can be used to identify suspicious messages and, and require additional effort, e.g., a confirmation input, by users. Both the filtering and the site blocking lists can fail against modern attacks. The filtering technique can fail for a number of reasons, such as a relatively high false-positive rate that leads users to disable the features or ignore warnings, even for content that is actually an attack. Further, the attacker can design messages to avoid detection, e.g., by indirectly determining the heuristics used by the filter, or by directly testing their messages against their own copy of the filtering software. For example, an attacker could send their message to themselves, and change the message until it passes through the filtering software. The site blocking lists fail because of the delay between the start of the attack and detection of the attack. A potentially large number of victims can be attacked before the attack is detected. Neither of these techniques works against attacks that are specifically targeted against a small number of victims. Targeted attacks involve tailoring messages to bypass filtering, and the small volume of attacks reduces the likelihood of the phishing site being detected at all, let alone early enough to detect all attacks.

SUMMARY

In one or more embodiments, users are protected against illegitimate "spoofed" links on web pages by detecting and disabling illegitimate hyperlinks in web pages received from web sites. Web link spoofing attacks deceptively present an illegitimate web link that appears similar to a legitimate web link, but with subtle differences in text characters that cause the link to load an illegitimate web page. Users can be lured into unknowingly clicking on or selecting the illegitimate link. The illegitimate page can, for example, request information from the user, and perform other malicious or potentially damaging operations.

A web link has two pieces of information: link text, which can be any text, such as a label or the URL to which a link points, and a URL portion, which is the actual URL that is used to load the linked page when the link is selected in a web browser. Spoofing attacks can set the link text to the name or URL of a legitimate web site while setting the link URL to the web address of an illegitimate web site. Users can look at the link URL to attempt to verify that the link refers to a web site that the user expects. For example, a link to an illegitimate web site URL, www.g00d.com, in which the letter o has been replaced with the number 0, appears visually similar to the legitimate web site URL good.com, but actually refers to a different site. A user is unlikely to detect the difference between the legitimate and illegitimate URLs because of their visual similarity. The techniques disclosed herein address this problem by identifying and disabling such spoofed URLs on web pages, so that users cannot follow the spoofed URLs to illegitimate web sites. A number of techniques are disclosed, including a normalization technique that can convert variations on characters, such as the letter o and the number 0, into safer text that does not include unlikely variations on characters. A comparison-based technique is also disclosed, which compares the link text to the link URL to identify spoofed links, based on observations about the occurrence of differences between the link text and link URL. For example, if the link text is visually similar to, but not the same as, the link URL, then the link is likely to be illegitimate.

In one or more embodiments, a technique of detecting illegitimate links on a web page is disclosed. The technique includes receiving a web link that includes link text and a link address, generating normalized link text based upon the link text, wherein characters in the link text that are visually similar are represented by a single normalized character identifier in the normalized text, determining whether the normalized link text is in the format of a link address, and determining that the text is safe when the normalized link text is not in the format of a link address. Embodiments can include determining whether the normalized link text matches the link address, determining that the text is safe when the normalized link text matches the link address, and determining that the text is unsafe when the normalized link text does not match the link address. Embodiments can further include disabling the web link on the web page when the text is determined to be unsafe.

Embodiments can also include attempting to extend the normalized link text to include context text from the left or right side of the normalized link text when the normalized link text is not in the format of a link address, and determining that the text is safe when there is no additional context text to the left or right of the normalized link text. Attempting to extend the normalized link text to include context text from the left or right side of the normalized link text can include determining whether there is additional context text to be displayed adjacent to the normalized link text, and extending the normalized text to include the additional context text, and repeating the generating of normalized text, the determining, and corresponding responsive actions, wherein the generating of normalized text is based upon the additional context text when there is additional context text to be displayed adjacent to the normalized link text.

Embodiments can further include attempting to extend the normalized link text to include context text from the left or right side of the normalized link text when the normalized link text matches the link address, and determining that the text is safe when there is no additional context text to the left or right of the normalized link text. Attempting to extend the normalized link text to include context text from the left or right side of the normalized link text can include determining whether there is additional context text displayed adjacent to the normalized link text, and extending the normalized link text to include the additional context text in response to determining that there is additional context text displayed adjacent to the normalized link text, and repeating the generating of normalized text, the determining, and corresponding responsive actions, wherein the normalized text is generated based upon the additional context text.

In one or more embodiments, illegitimate links on web pages can be detected. The embodiments can receive a web link that includes link text and a link address, generate normalized link text based upon the link text, wherein characters in the link text that are visually similar are represented by a single normalized character identifier in the normalized text, determine whether the normalized link text is in the format of a link address, determine that the text is safe in response to determining that the normalized link text is not in the format of a link address, determine whether the normalized link text matches the link address, determine that the text is safe in response to the normalized link text matching the link address, and determine that the text is unsafe in response to determining that the normalized link text does not match the link address.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
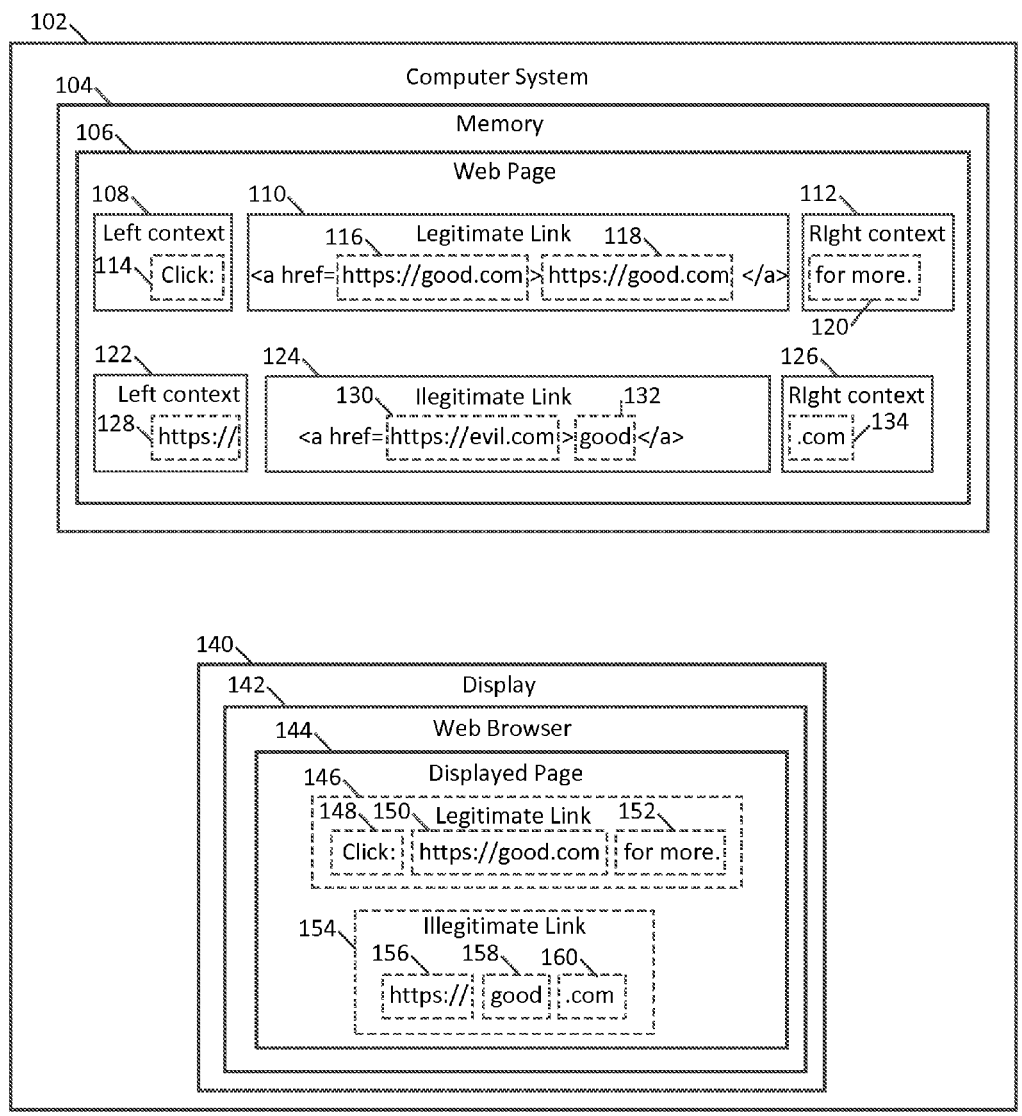
FIG. 1 is an illustrative drawing of links on a web page in accordance with one or more embodiments of the invention.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

The techniques described herein provide a defense against a specific aspect of the attacks: the link to the phishing site. An attacker can control the link text that is displayed on web pages that are served or provided by the attacker. One type of attack changes the link text to a URL that is visually different from the link URL. Such attacks can be detected by users who look closely at the link URL (e.g., by hovering a cursor over the link, or observing the browser address field after following the link, as described above). More sophisticated attacks use link URL's that appear legitimate, e.g., by replacing characters with different characters that are visually similar, so that the illegitimate link is difficult to detect by a visual comparison to an expected URL.

In one or more embodiments, a web link has two pieces of information: link text, which can be any text, such as a label or the URL to which a link points, and a URL portion, which is the actual URL that is used to load the linked page when the link is selected in a web browser. Spoofing attacks can set the link text to the name or URL of a legitimate web site while setting the link URL to the web address of an illegitimate web site. Users can look at the link URL to attempt to verify that the link is to a web site that the user expects. The user ordinarily expects the link URL to correspond to the web site named or identified by the link text, so the user expects that if the link is illegitimate, then the link's URL should be different from the site indicated by the link text. Spoofing attacks, however, use a falsified, i.e., spoofed, link URL that appears visually similar or appropriate for the web site named by the link text. For example, a link to an illegitimate web site URL g00d.com, in which the letter o has been replaced with the number 0, appears visually similar to the legitimate web site URL good.com, but actually refers to a different site. A web link that refers to the illegitimate site can have link text that shows the legitimate URL, good.com or the illegitimate URL g00d.com, and a link URL that refers to the illegitimate g00d.com URL. A user is unlikely to detect the difference between the legitimate and illegitimate URLs because of their visual similarity. The techniques disclosed herein address this problem by identifying and disabling such spoofed URLs, so that users cannot follow the spoofed URLs to illegitimate web sites. A number of techniques are disclosed, including a normalization technique that can convert variations on characters, such as the letter o and the number 0, into safer text that does not include unlikely variations on characters. A comparison-based technique is also disclosed, which can compare the link text to the link URL to identify spoofed links, based on observations about the occurrence of differences between the link text and link URL. For example, if the link text is visually similar to, but not the same as, the link URL, then the link is likely to be illegitimate.

Embodiments of the invention focus on detecting cases in which a user is likely to be misled by the text portion of a web link. URL spoofing attacks are detected by determining whether the link text of a given link is likely to be misinterpreted as being a URL, because users are likely to trust and follow a link that appears to display a valid URL.

Spoofing attacks often involve content that looks like what the user expects to see. In one or more embodiments, a URL spoofing detector receives a web link as input, and determines whether the web link is safe, i.e., legitimate, unsafe, likely safe, or likely unsafe. The "likely" results indicate that the safe or unsafe result is likely to be correct, but may be incorrect, and should be handled according to the application's requirements. One application might allow likely safe links to be presented to users, whereas another application with stricter requirements might prevent likely safe links from being presented to users. The spoofing detector analyzes the URL to identify a spoofed URL, which contains one or more spoofed characters that look similar to the characters in the URL the user expects, but are not the actual expected characters. An attacker can take advantage of such spoofed URLs by registering the host name portion of the spoofed URL and operating or using a server that responds to requests sent to the spoofed host name address. Web requests and data submissions that use the spoofed URL will then be sent to the attacker's server. The user is unlikely to recognize that the spoofed URL differs from an expected URL for the link, because the characters in the spoofed URL look similar to the characters in the expected URL.

In one or more embodiments, content, such as a web page, email, instant message, or other text content, is checked to determine if it includes any unsafe links. The URL spoofing detector can be invoked to check each link, e.g., HTML anchor element, in the content. Each link is analyzed by the representation of each character in the link that will be presented to the user with the URL that the link actually points to. That is, the link text is analyzed to determine if it looks like a URL. If so, the text is compared to the URL to determine whether the text that is displayed matches the actual URL. If the link text is not a URL, but is instead a textual phrase such as "Click here to Unsubscribe," then an analysis is not performed. If the link is a URL, or has the appearance of a URL, the URL text is compared to the link text. If a user sees a URL in the text, e.g., as part of the link text, then the URL is likely to believe that the URL is legitimate.

In one or more embodiments, the URL and link text are each reduced to a normalized form. The normalized form is a representation of the characters without the decorations that can be added to text. Unicode provides a normalization feature that removes the decorators can be used to reduce a Unicode character to a basic form. For example, Unicode has different characters for an ordinary e, a small mathematical e, a large mathematical e, a bold mathematical e, and so on. The Unicode normalization can be applied to the different characters that are variations on the same base character e, and returns the base e character (e.g., an uppercase or lowercase e) for each variation of the e character. However, the Unicode normalization function can be insufficient for converting characters that look similar into a single normalized character. For example, there can be two different normalized characters that look sufficiently similar as to be nearly identical visually, but are still considered different characters. Therefore, another equivalence table can be created, based on the behavior of attacks, to normalize variations of the same base character to the base character. For example, the attacker can control the fonts used to display links, and use variations in fonts to make different characters look similar.

In one or more embodiments, the URL spoofing detector applies a normalization function to the link text and the link URL. The normalization function can be a superset or subset of the Unicode normalization function, and can use information about font similarities, for example. The spoofing detector then determines whether the normalized text looks like a URL, since a user is likely to trust link text that looks like a URL, especially if the URL appears to be a URL to a web site that the user intends to visit. That is, if text displayed for a link, such as the link text and any text that precedes or follows the link text, looks like a URL, then the user is likely to be confused or mislead into thinking that the URL is legitimate, even if the actual link URL differs from the displayed text. Therefore, the spoofing detector can determine whether the normalized link text looks like a URL, and, if so, analyze the normalized text to determine whether the displayed URL text actually is the URL that it appears to be. That is, the spoofing detector can determine whether the link text, when displayed, is in the form of a URL, and whether the displayed URL matches the URL specified in the link URL. If the link text, when displayed, appears to be a URL, but is not actually the URL that it appears to be, then the text is likely a spoofed URL. So, to determine whether the link text, when displayed, appears to be a URL, additional transformations can be applied. Such transformations can involve checking any HTML text displayed to the left and/or right of the link text to determine if the HTML text and the link text together appear to be a URL. For example, a link that has link text "good.com" in an HTML anchor element does not necessarily resemble a URL, as there is no http prefix, so a user viewing the link text might not trust the link to be a legitimate URL. However, the web page on which the link text appears can include the text "https://" to be displayed in front of the link text good.com, using HTML such as the following:
https://<a href=http://evil.com>good.com</a>

As another example, the tailing portion of the displayed URL can be included in the text following the link, as shown below. In this example, the link text in the anchor element is the word "good" and the displayed URL is generated by the "https://" text that precedes the anchor element and the ".com" text that follows the anchor element:
https://<a href=http://evil.com>good</a>.com In the above examples, the text displayed is https://good.com. A user is likely to believe that https://good.com is a legitimate URL because of the "https://" HTML text that is displayed in front of the link text. Thus, to check if the link text "good.com" is a URL, a protocol identifier appropriate for the message channel, such as "http://", can be prepended to the link text prior to checking whether the link text resembles a URL. The spoofing detector therefore checks the link text alone, and also checks the link text in combination with the context in which it occurs when the page is displayed, such as the leading "https://" and the trailing ".com". The text can be expanded outward to include context to the left and/or right of the anchor tag. In one example, the expansion stops at whitespace. Further, whitespace around the link text can be stripped out, since white space is not visible in some fonts. There are other glyphs that are not visible, e.g., because they have lengths of zero, which are also stripped out.

Characters that look similar but are logically not the same can be used by an attacker to construct a spoofed URL. For example, if the URL is the uppercase GOOD.COM, the attacker can replace the O's with zeros to produce the similar-looking spoofed URL GOOD.COM. Thus, normalizing each character to a single "canonical" or base character does not necessarily result in a legitimate URL, since the letter O is unlikely to be normalized to the number 0 because they are not variations of the same character. One solution is to introduce a table of characters (i.e., glyphs) that are considered visually similar, in which case the letter O and the number 0 might be considered visually similar and normalized to the same canonical character. This table can include combinations of characters and fonts that are to be treated as equivalent. The font(s) used for the characters can be taken into account when determining whether characters are visually similar, since different characters may be more similar in some fonts than in others. For a given character and a given font, the table can be used to find a single canonical root character that is stripped of decorations such as italics and bold face. Then, when the root characters are used, the spoofing detector can determine whether the root characters look like a URL. If the text looks like a URL, then the text is compared to the link URL associated with the link. If the displayed text representation of the URL does not match the link URL that identifies the linked page or object, then there is likely a spoofing attack or an intention to mislead. For example, since the URL's GOOD.COM and GOOD.COM do not match, then an intention to mislead can be suspected, and the link can be disabled. Furthermore, text decorations can be used to change the visual appearance of text, so that the text that is displayed differs from the actual text. For example, the illegitimate URL doog.com can be displayed as good.com by applying a right-to-left text decoration. In this case, the actual link text can be the same as the illegitimate link URL, so a simple comparison of the link text to the link URL does not detect the spoofed URL.

FIG. 1 is an illustrative drawing of links on a web page in accordance with one or more embodiments of the invention. A computer system 102 includes a processor (not shown), a memory 104 that stores a web page 106, and a display 140. A web browser 142 executes on the processor and renders a displayed page 144 on the display 140. The displayed page 144 includes a displayed legitimate link 146 and a displayed illegitimate link 154. The displayed links are visual representations of markup language links, which include respective markup legitimate link 110 and illegitimate link 124. The legitimate link 110 includes a link URL 116 (https://good.com) and link text 118 (https://good.com). A left context 108 is text displayed to the left of the legitimate link 110 and includes the text Click 114. A right context 112 is text displayed to the right of the legitimate link 110 and includes the text "for more." 120. The illegitimate link 124 includes a link URL 130 (https://evil.com) and link text 132 (good), which is displayed in the displayed illegitimate link 154. A left context 122 is displayed to the left of the illegitimate link 124 and includes the text https:// 128. A right context 126 is displayed to the right of the illegitimate link 124 and includes the text.com 134.

The web browser 142 displays the legitimate link 146 as https://good.com 150 (the link text), with the left context 148 to the left of the link and the right context 152 to the right of the link. Similarly, the web browser 142 displays the illegitimate link 154 as "good" 158 but the left context 156 (https://) and the right context 160 (.com) cause the illegitimate link to appear to be the URL https://good.com. Since the link text is substantially different from the URL of the illegitimate link 154, the spoof detection process takes the left and/or right context 156, 160 into account when determining whether the link 154 is legitimate or illegitimate. Note that the left context need not be present, e.g., if there is no text to the left of the URL. Similarly, the right context need not be present, e.g., if there is no text to the right of the URL.

Figure 2:
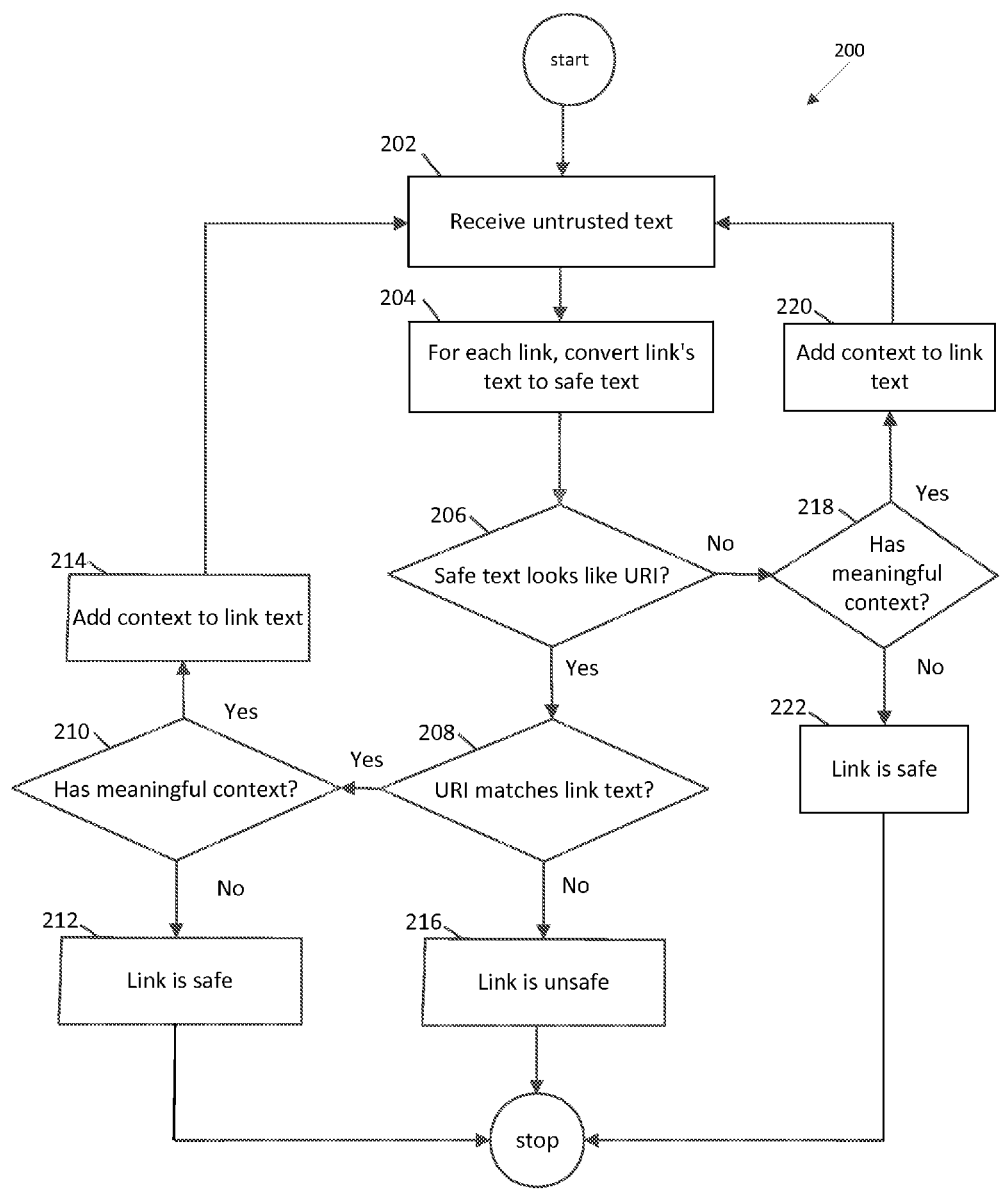
FIG. 2 is an illustrative flowchart of a process for determining whether one or more links are safe in accordance with one or more embodiments.

FIG. 2 is an illustrative flowchart of a process 200 for determining whether one or more links are considered to be safe in accordance with one or more embodiments. FIG. 2 determines whether each link in a given document is safe and legitimate, or unsafe, and potentially part of a link spoofing attack. The process 200 can be implemented as, for example, computer program code stored on a computer readable medium and executable by a processor to perform the described operations. The process 200 starts at block 202 by receiving a document, such as a web page, that has at least one link. Each link in the document includes link text and a link reference, such as a URL. The link text can be displayed as part of the document when the document is presented to a user, e.g., in a web browser, and the link reference can refer to another document, or an object such as a media file or a particular location in a document. The document can include text content that is interspersed with the link text. Each link's link text, e.g., good.com in the example described above, can be appear adjacent to a portion of the document's text content on one or both sides of the link text. As described in the good.com example above, this context surrounding the link text can appear to be part of the link text itself when the document is displayed. Therefore, the context surrounding a link is included along with the link text in the text that is analyzed when determining whether the link is safe. The extent of the context, i.e., the lengths of the context to the left and/or right of the link text, can be determined by the locations of white space to the left and/or right of the link text. More specifically, the context ordinarily extends from the link text to the whitespace that is closest to the link text on each side of the link text. The process 200 determines that the link is safe when the visible text and its surrounding context does not look like a link or the text does look like a link, and the text looks like what the link (URL) actually is. Otherwise, the process 200 determines that the link is not safe.

Block 204 is invoked for each link in the document, and converts the link text of each link to "safe text." The safe text can be understood as a normalized approximation of the link text that matches what a user is likely to perceive the link text as actually being, with the formatting and control characters matching the formatting expected of the link URL. The link text can be converted to safe text using, for example, the process show in FIG. 3. Block 206 then determines whether the safe text looks like a URL. Note that the terms URL and URI (Uniform Resource Identifier) are used interchangeably herein, and both are examples of types of web links, which are also referred to herein as locations. If block 206 determines that the safe text looks like a URL, then block 208 determines whether the URL that the safe text looks like matches the link URL of the link. If not, then block 216 indicates that the link is unsafe, and the process 200 ends. Otherwise, if the URL that the safe text looks like matches the link URL, then blocks 210 and 214 attempt to expand the context to include additional text, up to the nearest whitespace or other delimiter, and, if so, the process 200 is executed again, from block 204. More specifically, block 210 determines whether the link text has meaningful context, and, if so, block 214 adds the context to the link text being analyzed, and transfers control to block 202 to receive additional untrusted text, at which point the process repeats for any additional untrusted text that is present. Referring again to block 210, if block 210 determines that the link does not have meaningful context, then block 212 indicates that the link is safe, and the process ends. Referring back to block 206, if block 206 determines that the safe text does not look like a URL, then control transfers to block 218, which determines whether the link text has meaningful context. If so, then block 220 adds the meaningful context to the original link text, and the process starts again at block 202. If block 218 determines that the safe text does not have meaningful context, then the process ends at block 222, which indicates that the link is safe. The operations illustrated in FIG. 2 are shown in more detail in the following figures.

Figure 3:
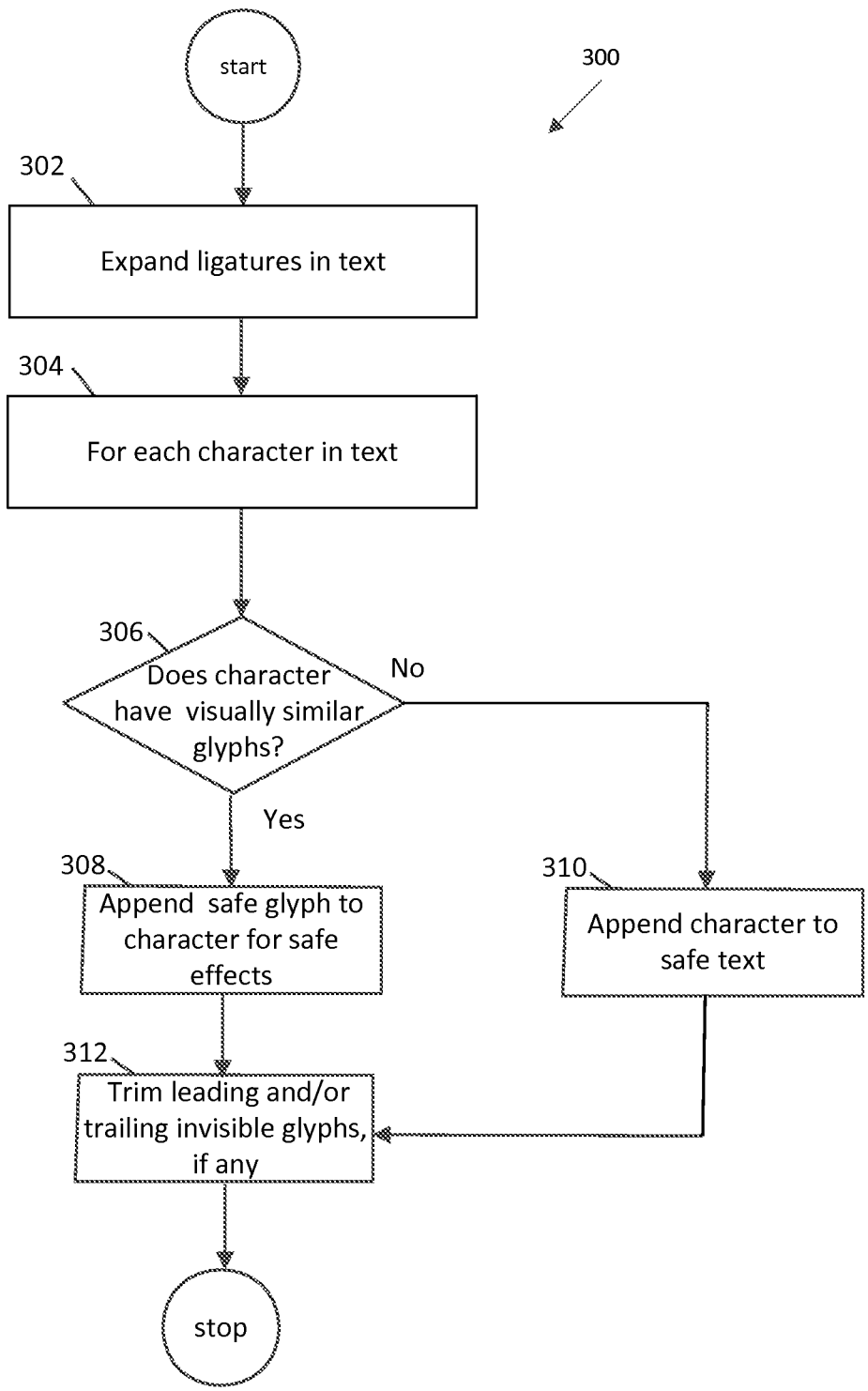
FIG. 3 is an illustrative flowchart of a process for generating safe text in accordance with one or more embodiments.

FIG. 3 is an illustrative flowchart of a process 300 for generating safe text in accordance with one or more embodiments. Process 300 can be implemented as, for example, computer program code encoded on a computer readable medium and executable by a processor of a computer system. Process 300 begins at block 302 when the process 300 is invoked by, for example, block 204 of FIG. 3. Block 302 expands ligatures in the text. Ligatures are single characters that appear to be double characters, such as ff. An ff ligature is a single character, but appears to be two characters. Block 302 therefore converts ligatures such as the ff single character to two f characters. Block 304 processes each character in the text by invoking block 306 for each character. Block 306 determines whether the character has any visually similar glyphs, e.g., the Cyrillic c is visually similar to the English c. If so, block 308 appends the safe glyph for the character to the safe text result. If not, block 310 appends the character to the safe text. Block 312 then removes any leading and trailing invisible glyphs from the safe text, such as characters that have zero width.

Figure 4:
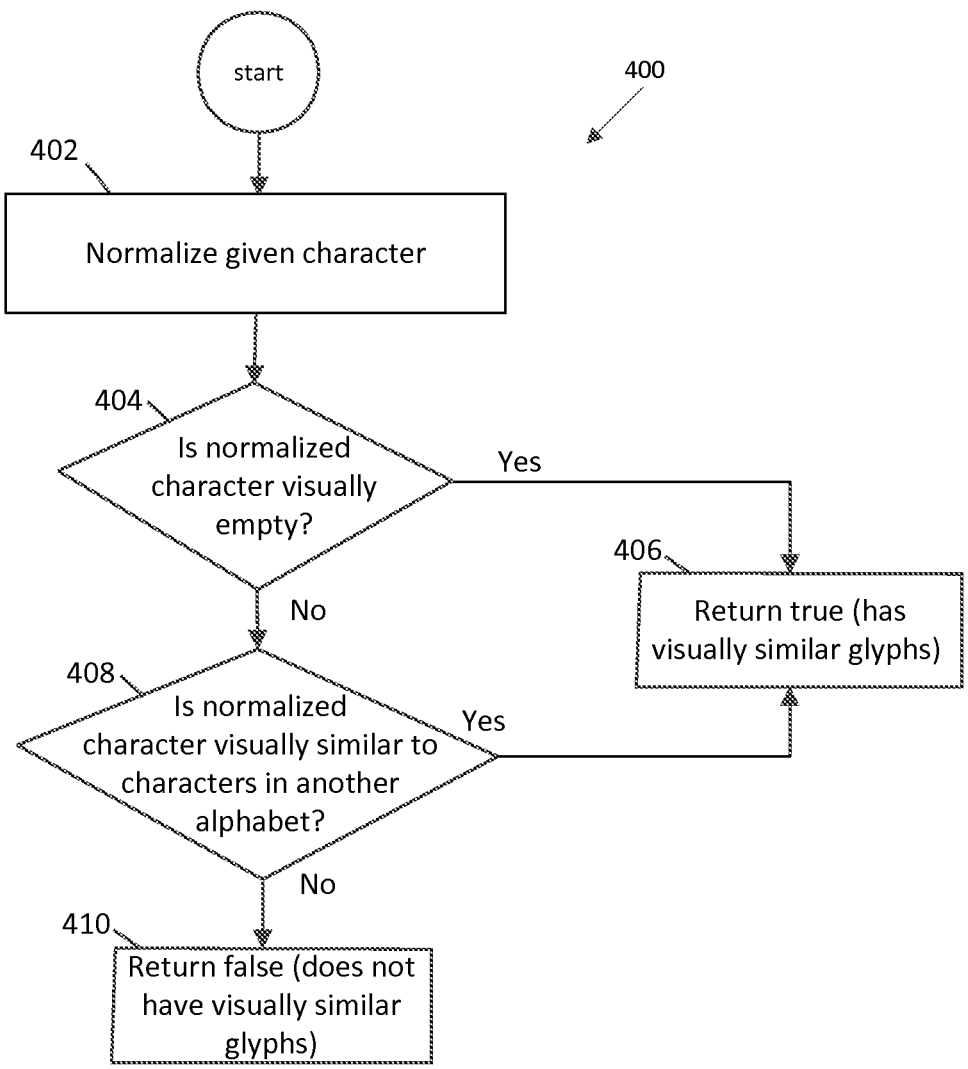
FIG. 4 is an illustrative flowchart of a process for determining whether a glyph has any visually similar glyphs in accordance with one or more embodiments.

FIG. 4 is an illustrative flowchart of a process 400 for determining whether a glyph (e.g., a character) has any visually similar glyphs in accordance with one or more embodiments. Process 400 can be implemented as, for example, computer program code encoded on a computer readable medium and executable by a processor of a computer system. Process 400 begins at block 402 by normalizing the given character, e.g., by converting the character to a canonical character. Block 404 determines whether the normalized character is visually empty. If so, block 406 returns true, to indicate that the character has visually similar glyphs. If not, block 408 determines whether the normalized character is visually similar to characters in another alphabet. If so, block 406 returns true. If not, block 410 returns false.

Figure 5:
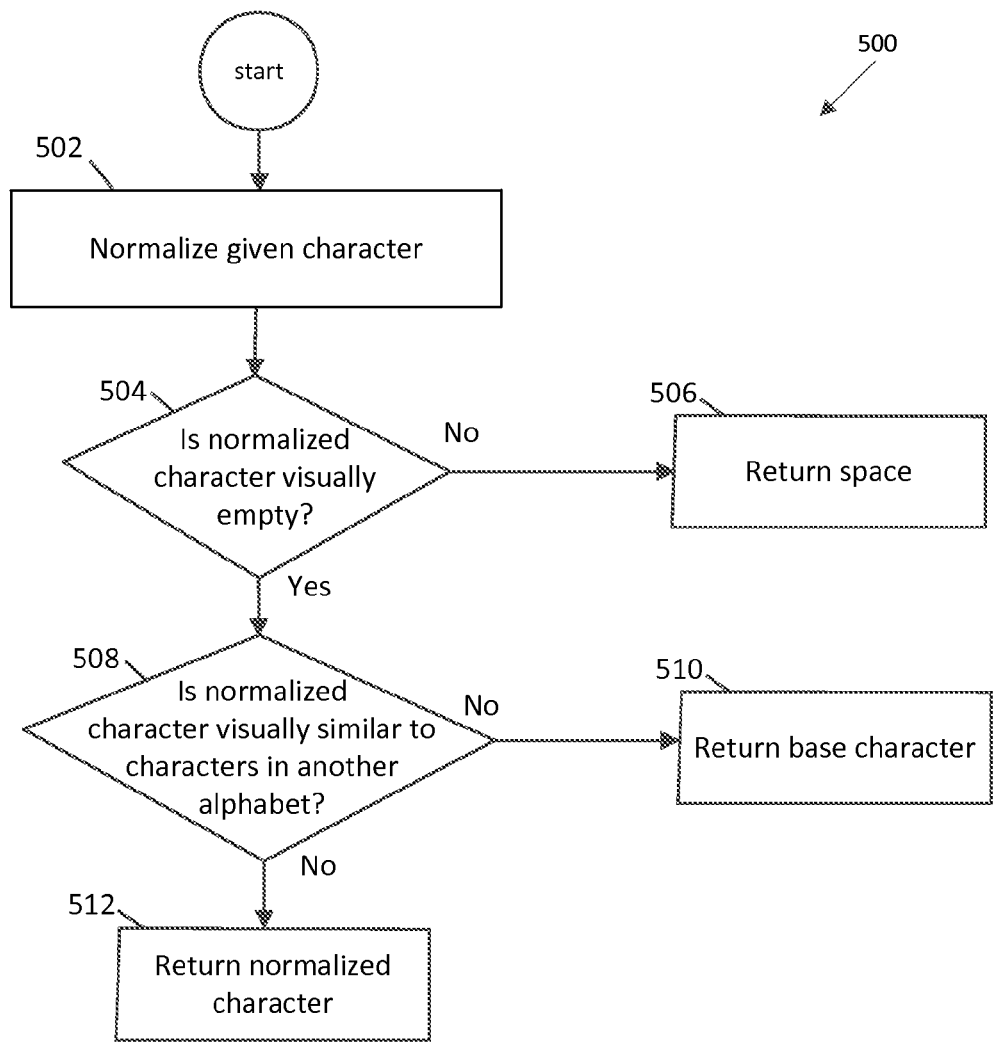
FIG. 5 is an illustrative flowchart of a process for determining safe glyphs for a given character in accordance with one or more embodiments.

FIG. 5 is an illustrative flowchart of a process 500 for determining safe glyphs for a given character in accordance with one or more embodiments. Process 500 can be implemented as, for example, computer program code encoded on a computer readable medium and executable by a processor of a computer system such as a server system. Process 500 begins at block 502, which normalizes the given character. Block 504 determines whether the normalized character is visually empty, e.g., does not generate a visible character on the display. If not, block 506 returns a space (' ') character. If so, block 508 determines whether the normalized character is visually similar to any other characters in another alphabet. If so, block 510 returns the base character. If not, block 512 returns the normalized character.

Figure 6A:
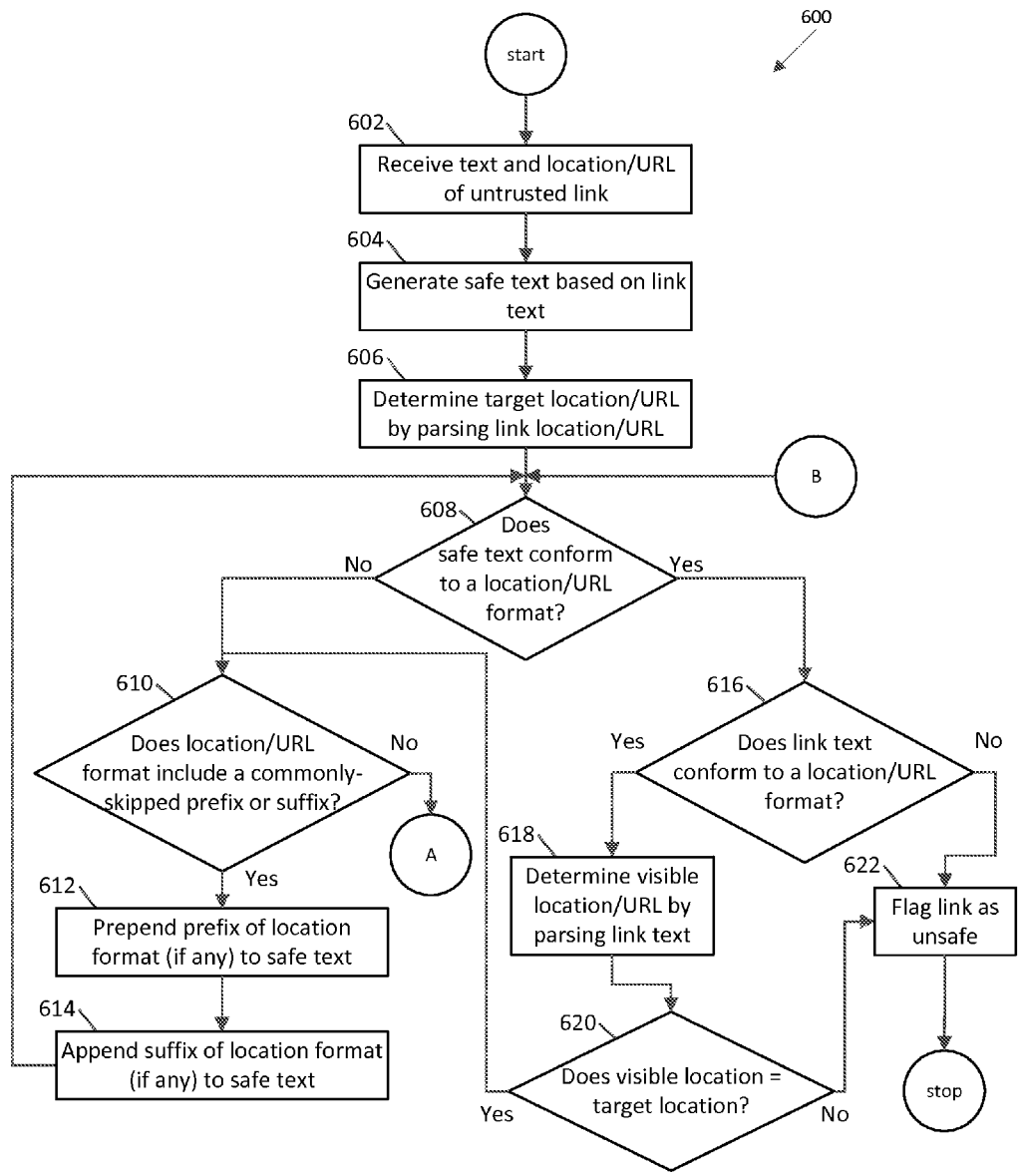
FIGS. 6A and 6B are illustrative flowcharts of processes for determining whether one or more links are safe in accordance with one or more embodiments.
Figure 6B:
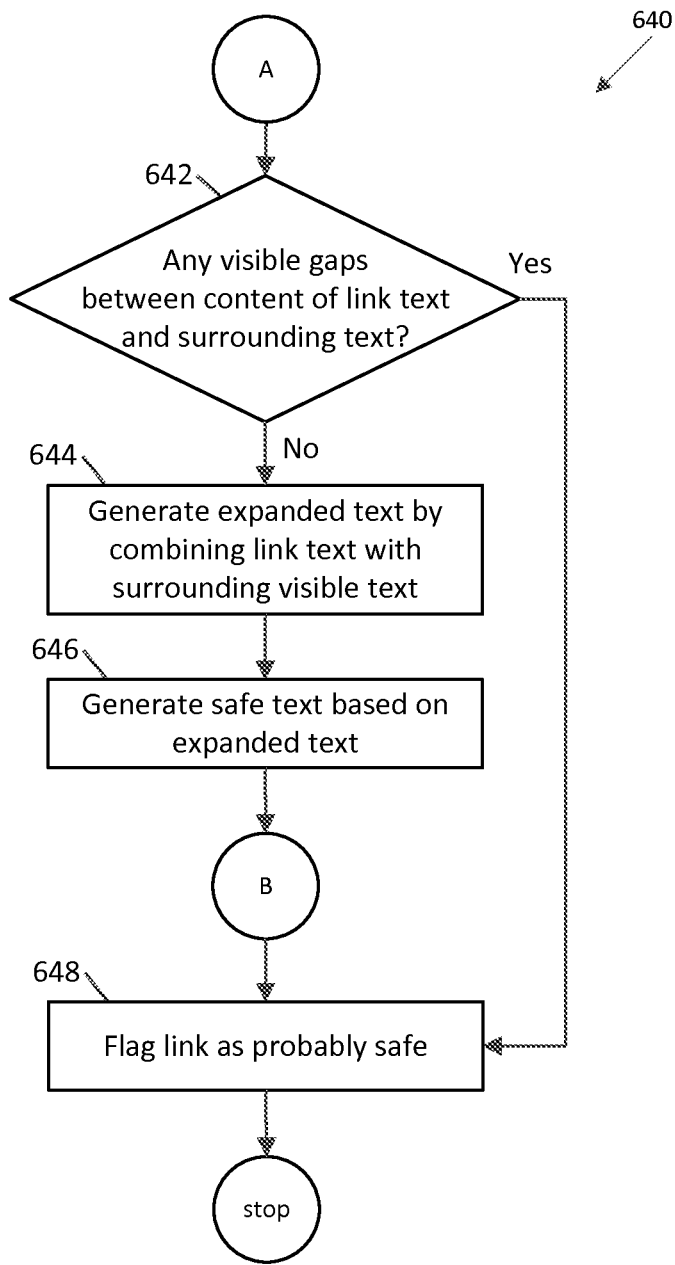

FIGS. 6A and 6B are illustrative flowcharts of processes 600 and 640, respectively, for determining whether one or more links are considered to be safe in accordance with one or more embodiments. FIGS. 6A and 6B determine whether a given link is probably safe and legitimate, or unsafe, and potentially part of a link spoofing attack. FIGS. 6A and 6B and are similar to FIG. 2, but include more detail than is shown in FIG. 2. Processes 600 and 640 can be implemented as, for example, computer program code stored on a computer readable medium and executable by a processor to perform the described operations. Process 600 can be invoked when a web browser receives a web page from a web server and is preparing to display the web page. The web browser can disable or not display any links that the process 600 determines to be unsafe. Process 600 starts at block 602 by receiving the text and location (e.g., URL) of an untrusted link. Note that the term "location" is used herein to refer to the address or network location of the object or page referenced by the link. URLs and URIs are examples of locations, and other types of location are contemplated, such as file names, network addresses, and the like.

Block 604 generates safe text based on the link text by, for example, invoking process 300 of FIG. 3 to convert the link text to the safe text. Block 606 determines a target location from the link location by parsing the link location. Parsing may include verifying that the link location conforms to a location format such as the URL format, and discarding extraneous characters that are not part of the location according to the format. Next, block 608 determines whether the safe text generated at block 604 conforms to a location format, such as the URL format. Block 608 can, for example, attempt to parse the safe text into the elements of the URL format. The parsing can be done by searching the string for the elements of the URL format, e.g., protocol, a colon followed by two slashes, host, optional port number, and resource path according to the URL format's syntax, e.g., protocol://host/path, wherein protocol can be http, https, ftp, and so on. Note that block 608 corresponds to block 206 of FIG. 2. If the safe text generated from the link text does not include one or more of the location format's elements, or otherwise does not conform to the location format, then block 608 transfers control to block 610. Block 610 determines whether the location format has a commonly skipped or omitted prefix or suffix, such as http://. If the format has a commonly skipped prefix, then block 612 prepends the skipped prefix to the safe text. Similarly, if the format has a commonly skipped suffix, then block 614 appends the suffix to the safe text. Thus, blocks 610-614 add any context that surrounds the location as displayed on the web page, similarly to the determination and addition of meaningful context at blocks 210 and 214 of FIG. 2. Execution continues at block 608 by repeating the check of whether the safe text conforms to a location format. If the safe text does not conform to a location format, then block 610 is executed again as described above. If block 610 determines that the location format does not include a commonly skipped prefix, then control transfers to block 642 of FIG. 6B via transfer point A, and process 640 is executed as described below.

If block 608 determines that the safe text conforms to a location format, then block 616 determines whether the link text conforms to a location format. Block 616 can be implemented by, for example, parsing the link text using one or more location formats until the link text is successfully parsed with one of the formats, in which case block 618 executes, or the link text does not match any of the formats, in which case block 622 flags the link as unsafe, and the process ends. Otherwise, if the link text does conform to a location format, block 618 determines the visible location, e.g., by parsing the link text, or by using the results of the parsing at block 616. Block 620 determines whether the visible location matches (e.g., is the same as or equals) the target location. If not, block 622 flags the link as unsafe, and the process ends. If block 620 determines that the visible location matches the target location, then control is transferred to block 610, and execution continues as described above. Note that block 620 corresponds to block 208 of FIG. 2.

Process 640 of FIG. 6B is executed when control point A of FIG. 6A is reached. Process 640 starts at block 642, which determines whether there are any visible gaps between the content of the link text and the surrounding text in the displayed rendering of the web page that includes the link. If not, block 644 generates expanded text by combining the link text with the surrounding visible text. That is, block 644 includes the surrounding visible text in the link text, to create link text that corresponds to the text presented on the display. Block 646 generates safe text based on the expanded text by, for example, executing the process of FIG. 3 to convert the expanded text to safe text. Process 640 then continues at block 608 of FIG. 6A by following transfer point B to process 600, at which point process 600 continues to execute, starting from block 608, as described above. Process 600 can either flag the link as unsafe at block 622, or return without flagging the link, in which case block 648 flags the link as being probably safe. The web browser can then display the link as part of the web page, and allow the user to click on the link to open the web page referred to by the link's location (e.g., URL).

Figure 7:
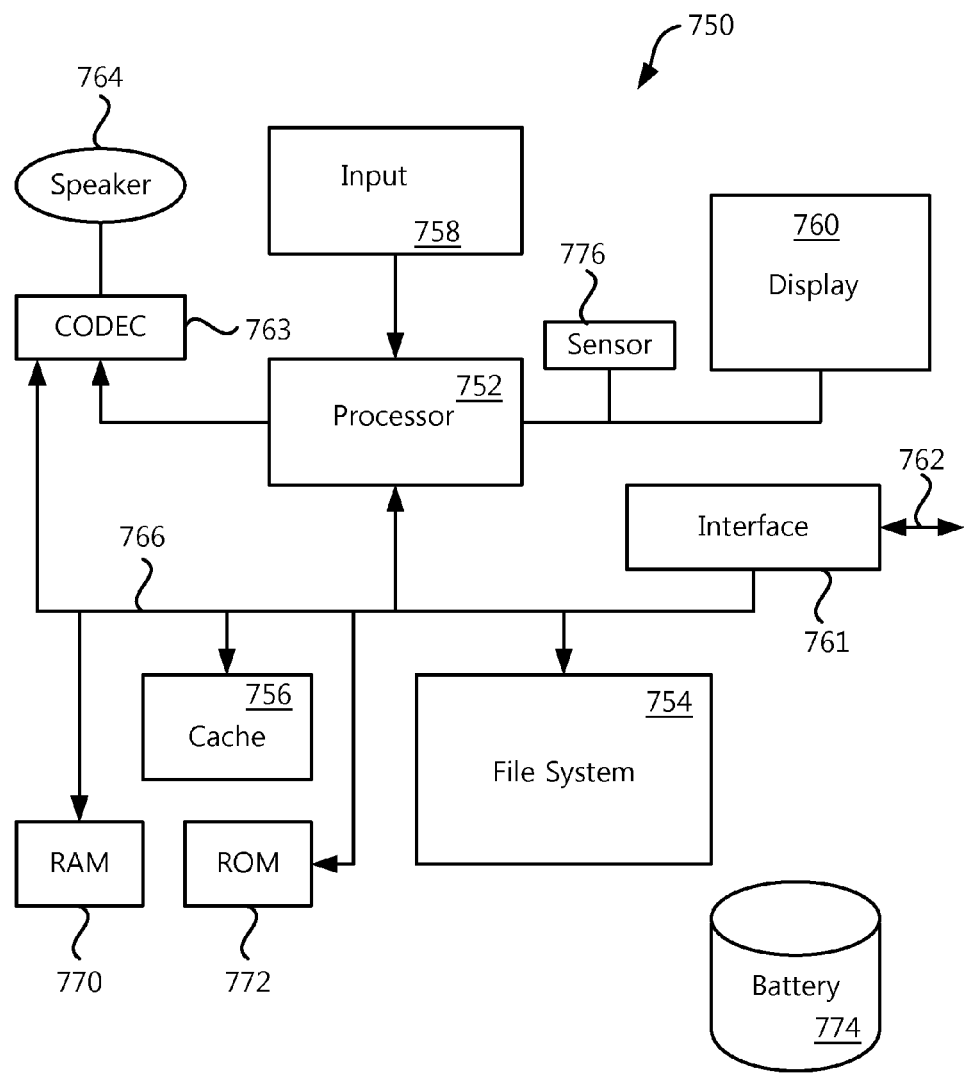
FIG. 7 is a block diagram of an electronic device suitable for use with the described embodiments.

FIG. 7 is a block diagram of an electronic device 750 suitable for use with the described embodiments. The electronic device 750 illustrates circuitry of a representative computing device. The electronic device 750 includes a processor 752 that pertains to a microprocessor or controller for controlling the overall operation of the electronic device 750. The electronic device 750 stores media data pertaining to media items in a file system 754 and a cache 756. The file system 754 is, typically, a storage disk or a plurality of disks. The file system 754 typically provides high capacity storage capability for the electronic device 750. However, since the access time to the file system 754 is relatively slow, the electronic device 750 can also include a cache 756. The cache 756 is, for example, Random-Access Memory (RAM) provided by semiconductor memory. The relative access time to the cache 756 is substantially shorter than for the file system 754. However, the cache 756 does not have the large storage capacity of the file system 754. Further, the file system 754, when active, consumes more power than does the cache 756. The power consumption is often a concern when the electronic device 750 is a portable media device that is powered by a battery 774. The electronic device 750 can also include a RAM 770 and a Read-Only Memory (ROM) 772. The ROM 772 can store programs, utilities or processes to be executed in a non-volatile manner. The RAM 770 provides volatile data storage, such as for the cache 756.

The electronic device 750 also includes a user input device 758 that allows a user of the electronic device 750 to interact with the electronic device 750. For example, the user input device 758 can take a variety of forms, such as a button, keypad, dial, touch screen, audio input interface, visual/image capture input interface, input in the form of sensor data, etc. Still further, the electronic device 750 includes a display 760 (screen display) that can be controlled by the processor 752 to display information to the user. A data bus 766 can facilitate data transfer between at least the file system 754, the cache 756, the processor 752, and the CODEC 763.

In one embodiment, the electronic device 750 serves to store a plurality of media items (e.g., songs, podcasts, etc.) in the file system 754. When a user desires to have the electronic device play a particular media item, a list of available media items is displayed on the display 760. Then, using the user input device 758, a user can select one of the available media items. The processor 752, upon receiving a selection of a particular media item, supplies the media data (e.g., audio file) for the particular media item to a coder/decoder (CODEC) 763. The CODEC 763 then produces analog output signals for a speaker 764. The speaker 764 can be a speaker internal to the electronic device 750 or external to the electronic device 750. For example, headphones or earphones that connect to the electronic device 750 would be considered an external speaker.

The electronic device 750 also includes a network/bus interface 761 that couples to a data link 762. The data link 762 allows the electronic device 750 to couple to a host computer or to accessory devices. The data link 762 can be provided over a wired connection or a wireless connection. In the case of a wireless connection, the network/bus interface 761 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 776 can take the form of circuitry for detecting any number of stimuli. For example, sensor 776 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for detecting an illegitimate web link on a web page, the method comprising:
receiving a web link including link text and a link address, wherein the link text includes a plurality of characters;
converting the plurality of characters of the link text to normalized characters by:
determining whether the plurality of characters correspond to normalized characters included in a reference table, and
identifying a presence of a visually similar glyph in the reference table;
determining whether the link text having the normalized characters corresponds to a syntax of the link address; and
when the link text having the normalized characters corresponds to the syntax of the link address:
determining whether the normalized characters match the link address;
providing an indication that the web link is unsafe when the link text having normalized characters does not match the link address; and
providing an indication that the web link is safe when the link text having normalized characters matches the link address.

2. The method of claim 1, wherein converting the plurality of characters to normalized characters comprises at least one of removing character decorators or reducing a Unicode character to a basic form.

3. The method of claim 1, wherein determining whether the normalized characters correspond to the syntax of the link address comprises parsing the link address to determine whether the link address includes one or more valid location syntax elements.

4. The method of claim 3, further comprising:
determining whether the link address conforms to a universal Uniform Resource Locator (URL) syntax.

5. The method of claim 4, wherein the one or more valid location syntax elements comprises at least one of a colon followed by two slashes, a host, an optional port number, or a resource path according to the URL syntax.

6. The method of claim 1, further comprising:
determining whether a first character and a second character of the plurality of characters are visually similar in appearance.

7. The method of claim 1, further comprising:
disabling the web link upon receiving the indication that the web link is unsafe.

8. A non-transitory computer readable medium storing instructions that, when executed by a processor included in a computing device, cause the computing device to carry out steps that include:
receiving a web link including link text and a link address, wherein the link text includes a first set of a plurality of characters and the link address includes a second set of a plurality of characters;
determining whether a visual appearance of the first set of the plurality of characters is non-identical to the visual appearance of the second set of the plurality of characters by:
determining whether the first set of the plurality of characters corresponds to the second set of the plurality of characters included in a reference table and identifying a presence of a visually similar glyph in the reference table;
providing an indication that the web link is unsafe when the visual appearance of the first set of the plurality of characters is non-identical to the visual appearance of the second set of the plurality of characters; and
providing an indication that the web link is safe when the visual appearance of the first set of the plurality of characters is identical to the visual appearance of the second set of the plurality of characters.

9. The non-transitory computer readable medium of claim 8, wherein the steps further include:
disabling the web link upon receiving the indication that the web link is unsafe.

10. The non-transitory computer readable medium of claim 8, wherein the steps further include:
applying Unicode normalization to the first set of the plurality of characters and to the second set of the plurality of characters.

11. A system for detecting an illegitimate web link on a web page, the system comprising:
a processor; and
a memory storing computer readable instructions that when executed, cause the processor to carry out steps that include:
receiving a web link including link text and a link address, wherein the link text includes a plurality of characters;
determining whether a first character and a second character of the plurality of characters are visually similar;
converting the first character and the second character to a single normalized character upon determining that the first character and the second character are visually similar by:
determining whether the first character or the second character correspond to the single normalized character included in a reference table, and
identifying a presence of a visually similar glyph in the reference table;
determining whether the link text having the single normalized character corresponds to a syntax of the link address; and
when the link text having the single normalized character corresponds to the syntax of the link address:
determining whether the link text having the single normalized character is non-identical to the link address;
providing an indication that the web link is unsafe when the link text having the single normalized character is non-identical to the link address; and
providing an indication that the web link is safe when the link text having the single normalized character is identical to the link address.

12. The system of claim 11, wherein the steps further include: disabling the web link upon receiving the indication that the web link is unsafe.

13. The system of claim 11, wherein the steps further include: applying Unicode normalization to the first character and the second character of the plurality of characters upon determining that the first character and the second character are variations of a same base character.

14. The system of claim 11, wherein each of the first character and the second character include at least one of a letter, symbol, a ligature, or number.

15. The system of claim 11, wherein the steps further include: parsing the link address to determine whether the link address includes one or more valid location syntax elements.

* * * * *